United States Patent
Wyers

(10) Patent No.: US 7,152,365 B2
(45) Date of Patent: Dec. 26, 2006

(54) METHOD OF CAPTURING INSECTS

(76) Inventor: Philip W. Wyers, 14705 E. Aberdeen Ave., Centennial, CO (US) 80016

( * ) Notice: Subject to any disclaimer, the term of this patent is extended or adjusted under 35 U.S.C. 154(b) by 0 days.

(21) Appl. No.: 10/699,096

(22) Filed: Oct. 31, 2003

(65) Prior Publication Data

US 2004/0107631 A1 Jun. 10, 2004

Related U.S. Application Data

(62) Division of application No. 10/069,322, filed as application No. PCT/US01/19777 on Jun. 21, 2001, now Pat. No. 6,651,380.

(60) Provisional application No. 60/213,008, filed on Jun. 21, 2000.

(51) Int. Cl.
*A01M 1/06* (2006.01)

(52) U.S. Cl. ........................................... 43/139

(58) Field of Classification Search ................. 43/139; 15/341, 344
See application file for complete search history.

(56) References Cited

U.S. PATENT DOCUMENTS

| | | | | | |
|---|---|---|---|---|---|
| 289,997 | A | * | 12/1883 | Luze | 43/139 |
| 454,720 | A | * | 6/1891 | Dexter | 43/139 |
| 946,801 | A | * | 1/1910 | Hutchison | 15/341 |
| 1,008,205 | A | * | 11/1911 | Schirra | 15/341 |
| 1,141,039 | A | * | 5/1915 | Cox | 43/139 |
| 1,146,540 | A | * | 7/1915 | Winter | 15/341 |
| 1,161,087 | A | * | 11/1915 | Tyler | 15/341 |
| 1,212,815 | A | * | 1/1917 | Roth | 15/344 |
| 1,308,497 | A | * | 7/1919 | Jolly | 43/139 |
| 1,324,635 | A | * | 12/1919 | Ascoli | 15/341 |
| 1,797,557 | A | * | 3/1931 | Stine et al. | 43/139 |
| 2,567,616 | A | * | 9/1951 | Moore | 43/139 |
| 2,992,770 | A | * | 7/1961 | Keiser | 43/139 |
| 3,330,063 | A | * | 7/1967 | Lockwood | 43/139 |
| 3,965,608 | A | * | 6/1976 | Schuman | 43/139 |
| 4,074,458 | A | * | 2/1978 | Catlett | 43/139 |
| 4,175,352 | A | * | 11/1979 | Catlett | 43/139 |
| 4,488,331 | A | * | 12/1984 | Ward | 15/339 |
| 4,733,495 | A | * | 3/1988 | Winnicki | 43/139 |
| 4,780,986 | A | * | 11/1988 | Broomfield et al. | 43/139 |
| 4,794,725 | A | * | 1/1989 | Numerick | 43/139 |
| 4,817,330 | A | * | 4/1989 | Fahringer | 43/133 |
| 4,918,857 | A | * | 4/1990 | Wade et al. | 43/139 |
| 5,175,960 | A | * | 1/1993 | Wade et al. | 43/139 |

(Continued)

FOREIGN PATENT DOCUMENTS

DE 3225330 A1 * 1/1984

(Continued)

*Primary Examiner*—Darren W. Ark
(74) *Attorney, Agent, or Firm*—Timothy J. Martin; Michael R. Henson; John W. Carpenter

(57) ABSTRACT

A method of capturing insects comprises, in one embodiment, provision of an elongated housing which permits airflow between upstream and downstream ends while impeding passage of insects therebetween, a movable closure which is biased into a closed position to hinder access to the interior through the upstream end, and a movable purge valve. In operation, air is evacuated through the purge opening establishing vacuum source within the housing interior, the movable closure is placed proximate to a target insect, and an air pressure differential is created whereby ambient air is drawn into the housing interior at a sufficient flow to cause the movable closure to open, thus creating an entryway into the upstream region drawing the insect into the upstream region to be trapped when the movable closure returns to the closed position.

32 Claims, 14 Drawing Sheets

U.S. PATENT DOCUMENTS

| | | | |
|---|---|---|---|
| 5,280,668 A * | 1/1994 | Fortune | 15/341 |
| 5,367,821 A * | 11/1994 | Ott | 43/139 |
| 5,402,598 A * | 4/1995 | Wade et al. | 43/139 |
| 6,640,489 B1 * | 11/2003 | Boulton | 43/139 |
| 6,651,380 B1 * | 11/2003 | Wyers | 43/139 |
| 2005/0246945 A1 * | 11/2005 | Evink | 43/139 |

FOREIGN PATENT DOCUMENTS

| | | | |
|---|---|---|---|
| DE | 4112266 C1 * | 4/1991 | |
| DE | 4327150 A1 * | 12/1993 | |
| GB | 2236467 A1 * | 4/1991 | |
| JP | 2000-69896 B1 * | 3/2000 | |
| JP | 2001-327238 B1 * | 11/2001 | |
| JP | 2003-235427 B1 * | 8/2003 | |
| WO | WO-92/07461 A1 * | 5/1992 | |

* cited by examiner

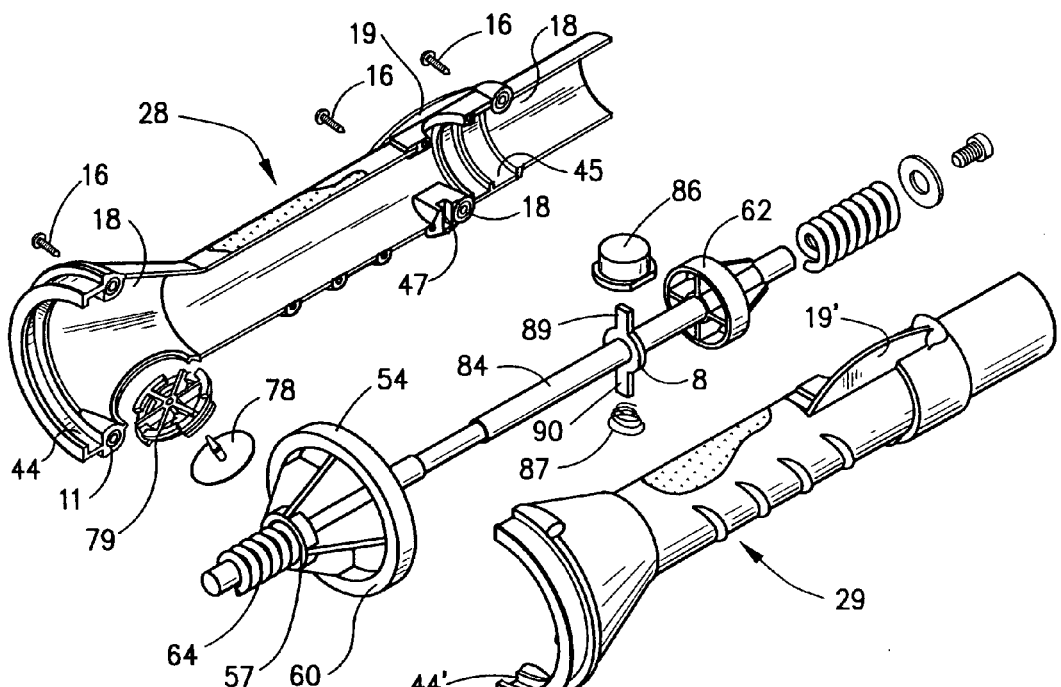
Fig.4
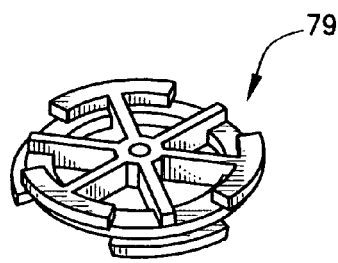
Fig.21a
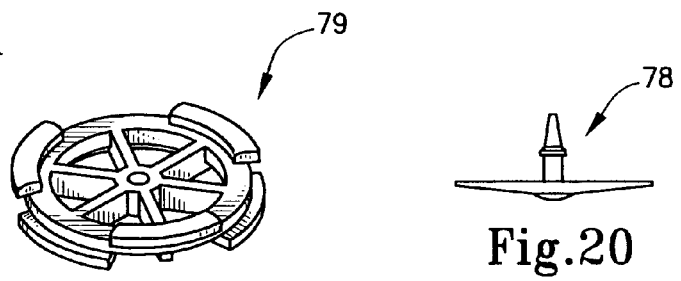
Fig.21b
Fig.20

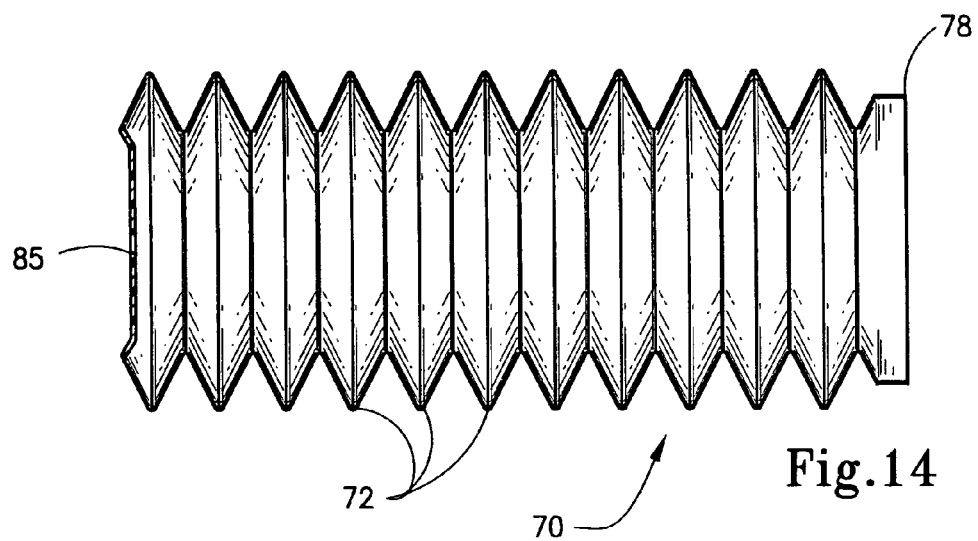
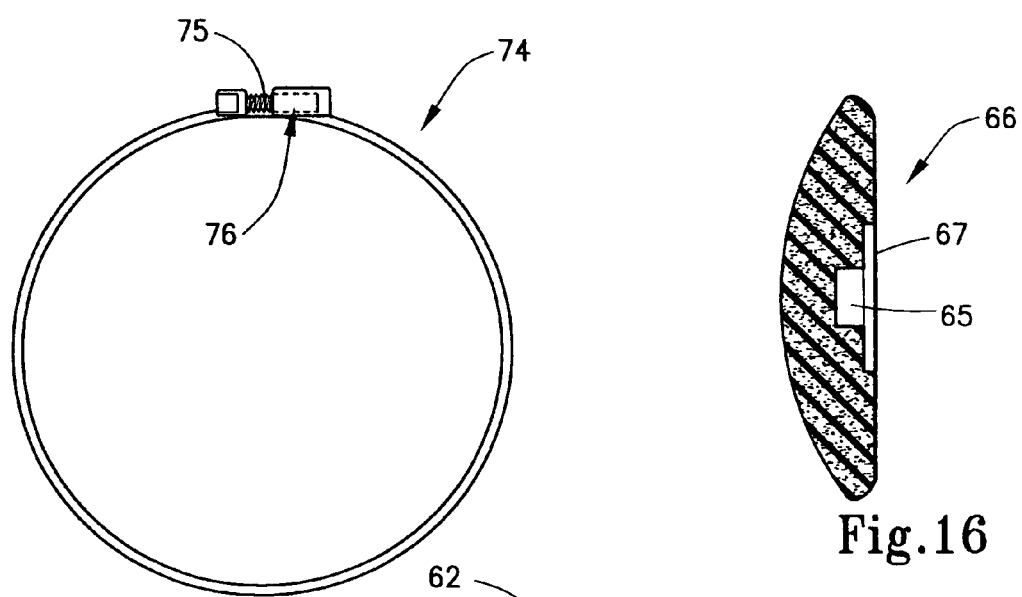
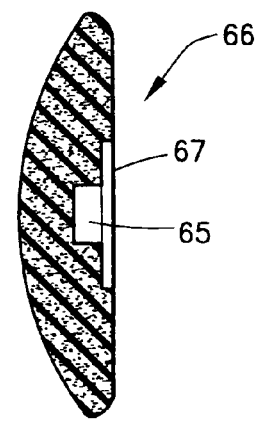
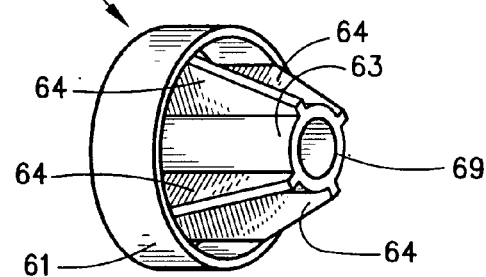

METHOD OF CAPTURING INSECTS

RELATED APPLICATION

This application is a divisional application of U.S. patent application Ser. No. 10/069,322, filed Feb. 21, 2002, now U.S. Pat. No. 6,651,380 issued Nov. 25, 2003.

FIELD OF THE INVENTION

The present invention generally relates to the field of insect collection and/or removal. More particularly, the present invention concerns a method of capturing insects through the provision of a manually actuated insect collection device for drawing insects into an interior region for collection or extermination

BACKGROUND OF THE INVENTION

Insects are among the most industrious animals on Earth, capable of living in almost any land habitat. Nearly one million species of insects are known to exist, many of which serve industrially beneficial uses in the ecosystem, while others are capable of destroying crops, trees, and houses and even carry harmful diseases such as malaria. Insects also provide a source of enjoyment or entertainment for some whose hobby is their collection, and others who keep insects as pets by maintaining ant farms, beehives and the like. Perhaps for most others, however, insects are considered pests that bite or sting and appear in unwanted places such as homes, offices, restaurants, and the like.

Many different types of pest control products are available to alleviate such nuisances. For example, topical skin creams and sprays help deter insects from stinging or biting. Similarly, insecticides are used by many in homes and other indoor areas to help prevent insects from entering. However, while these types of treatments may temporarily lessen the nuisance attributed to insects, they are generally ineffective at alleviating the problem in its entirety.

When insects enter indoor areas, many are likely to remove or exterminate them. Depending on the extent of the problem, it may be necessary to consult a certified exterminator to alleviate the problem. Perhaps the most common, and simplest way of killing and removing an insect, however, is through the use of a flyswatter or other crude concoction such as a rolled-up newspaper. Commercially available flyswatters are both practical and inexpensive and typically have a long handle for reaching insects that have alighted from high or hard to reach areas. Though simple and efficient, the drawback to these types of techniques is the unsightly remnants of the insects which are left behind on walls or windows, necessitating an additional clean-up step for the individual. Other known insect extermination techniques include flypaper and "bug lights" which serve to both attract and kill the flying insect. These types of devices, however, also have certain drawbacks that make their use indoors impractical because they are only efficient at killing insects in designated locations and also require subsequent removal of the exterminated pests.

Vacuum cleaners provide an attractive alternative to the aforementioned devices and have long been used to assist in the removal or extermination of insects. Vacuum cleaners typically do not present the individual with an additional clean-up step and provide a more sanitary and practical approach to removing insects from indoor areas. Vacuum cleaners are also more capable in removing insects due to the use of various attachments that extend the reach of the hose, narrow or widen the extent of the vacuum area, or provide special shapes that allow easy use for certain areas. Some attachments have been specifically designed to make the vacuum cleaner a more efficient tool for removing insects. For example, U.S. Pat. No. 4,279,095 to Aasen; U.S. Pat. No. 4,630,329 to Shores, and U.S. Pat. No. 4,488,331 to Ward each disclose attachments made for use with vacuum cleaners for the distinct purpose of capturing and removing insects.

While the collection of insects with a vacuum cleaner does not involve some of the uncleanly aspects of other conventional approaches, it too is not without certain disadvantages. For example, the length of an electrical cord or the length of the hose will limit the reach of many vacuum cleaners. Also, some vacuum cleaners can be cumbersome and awkward to maneuver, presenting a precarious situation for an operator requiring the use of a chair or a ladder to reach the insect. Finally, many vacuum cleaners have such a strong vacuum effect that the insect is killed once it is contained within the bag or other capturing device, such that these types of devices are not an attractive alternative for those individuals who want to capture insects for collection purposes.

There are several types of insect collection devices that have been designed to remedy some of these drawbacks. For example, U.S. Pat. No. 5,175,960 and related U.S. Pat. No. 5,402,598, both to Wade, disclose a collection device designed as a handheld battery operated vacuum. Although this device is not as cumbersome as some vacuum cleaners, or limited by the length of an electrical cord, its reliance on batteries to generate the necessary vacuum creates a different disadvantage. In addition to adding a separate expense, batteries have a limited useful life requiring that they be replaced or recharged to properly operate the device. As the battery begins to expire, it becomes less capable of capturing the insects. Since the operator may not be aware of the battery's power, the device is less dependable, and capable of failure at an inopportune time. Another example is U.S. Pat. No. 4,733,495 to Winnicki that discloses a handheld device wherein the insect is drawn into the device by means of a vacuum. Although this device is not dependent upon a separate power source, the vacuum is generated by the movement of a tube from a retracted position to an extended position. This requires the operator to ascertain the appropriate distance from which to hold the device from the insect to be captured. As a result, if the device is used incorrectly, the forward thrusting of the tube can potentially cause damage to walls, glass, or other surfaces on which the insect is found.

Accordingly, there remains a need to provide a new method of capturing insects through the provision of an insect collection device that can effectively and repeatedly capture insects for collection, viewing or later release, without risk of escape. Advantageously also, would be to employ such a methodology with an insect removal device which is easy to hold, does not require an external power source, and is easy to manufacture, operate and maintain. The present invention is directed to meeting these needs.

SUMMARY OF THE INVENTION

It is an object of the present invention to provide a new and improved method of capturing insects.

It is another object of the present invention to provide a method of capturing insects which permits the captured insects to be viewed and later released, if desired, without risk of escape.

A further object of the present invention is to provide such a method which can be repeatedly practiced without risking escape of previously captured insects.

It is yet another object of the present invention to provide a method of capturing insects which will not harm the captured insects or exterminate them, unless desired.

In accordance with these objectives, a method of capturing insects comprises the provision of an elongated housing having a sidewall which extends between upstream and downstream ends to substantially surround a housing interior. The housing is constructed to permit air to flow between the upstream and downstream ends while impeding passage of insects therebetween. A movable closure is provided at an upstream end portion of the housing and biased into a closed position which hinders access to the interior through the upstream end. Air is evacuated through the sidewall at in downstream region of the housing, thereby establishing a potential vacuum source within the housing interior. In a preferred embodiment, a purge valve is provided and movably disposed over a purge opening formed through the housing's sidewall,. Air is evacuated through this purge opening, thereby establishing the potential vacuum source within the housing interior.

The movable closure is preferably then placed proximate to a target insect(s) and air pressure is created within the upstream region that is less than ambient pressure at the upstream end, whereby ambient air is drawn into the housing interior at a sufficient flow to cause the movable closure to move into an open position. This creates an entryway into the upstream region from the upstream end and draws the insect into the upstream region where it is trapped when the closure returns to the closed position.

A compression chamber may be provided at a downstream end portion of the housing, whereby the step of evacuating air from the housing is accomplished by compressing the chamber into a compressed position. It is preferred that the compression chamber be mechanically maintained in the compressed position and resiliently biased into an uncompressed position. Creation of the air pressure differential can then be accomplished by allowing the compression chamber to return to the uncompressed position.

These and other objects will become more readily appreciated and understood from a consideration of the following detailed description when taken together with the accompanying drawings, which illustrate various embodiments of insect collection devices for accomplishing the methodology of the invention, and in which:

BRIEF DESCRIPTION OF THE DRAWINGS

FIG. 4 is an exploded perspective view of the insect collection device's primary housing section and its internal triggering assembly;

FIG. 14 is a right side view in elevation and in cross-section of the insect collection device's compression chamber;

FIG. 15 is an end view in elevation of the insect collection device's securement clamp;

FIG. 16 is a left side view in elevation and in cross-section of the insect collection device's bellows pad;

FIG. 18 is a enlarged perspective view of the insect collection device's second plunger shaft bearing guide;

FIG. 20 is a side view in elevation of the insect collection device's purge valve;

FIGS. 21(a) and 21(b) are each perspective views of the insect collection device's purge valve ring;

DETAILED DESCRIPTION OF THE INVENTION

Figure 1:
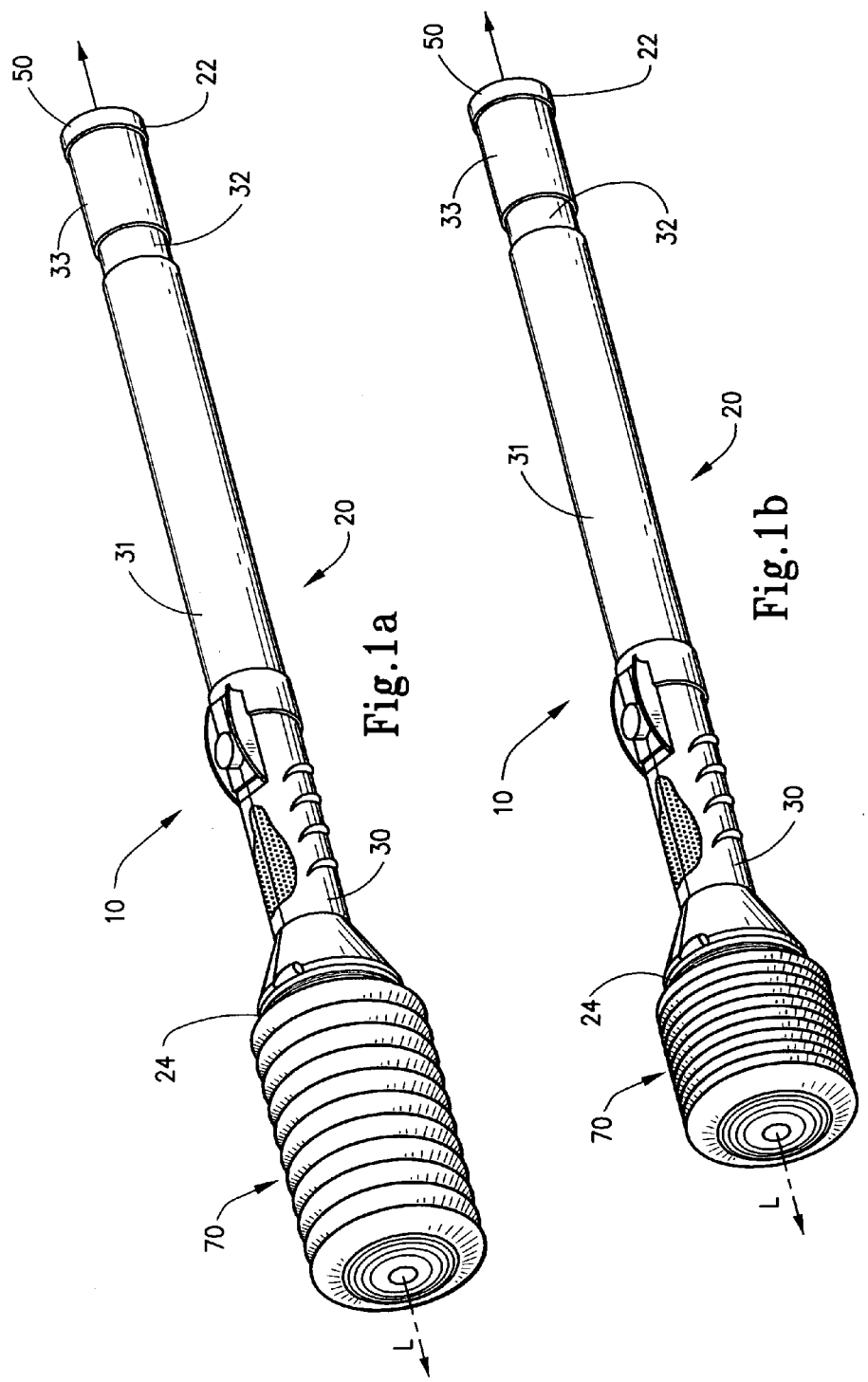
FIG. 1(a) is a perspective view of a first exemplary embodiment of an insect collection device for accomplishing the methodology of the present invention, and showing the device in the relaxed state.
FIG. 1(b) is a perspective view of the insect collection device of FIG. 1(a) and showing it in a ready state.

The methodology of the present invention may best be appreciated with reference to the drawings wherein various embodiments of insect collection devices are shown for accomplishing the methodology. Referring more particularly to these drawings, a first exemplary embodiment of the insect collection device 10 of the present invention is introduced in FIGS. 1(a) and 1(b). Insect collection device 10 is in the form of a hand operated mechanism which can be placed in close proximity to a target insect and manually actuated to draw the target insect into a collection region through a suctioning effect. As shown in these figures, insect collection device 10 comprises an elongated and generally tubular housing 20, a movable closure 50 and a compression chamber 70. Housing 20 extends about a housing interior along a central longitudinal axis "L" from a first upstream end 22 to terminate in a second downstream end 24. Movable closure 50 is disposed on an upstream end portion of housing 20, while compression chamber 70 is disposed on a downstream end portion of housing 20. As will be discussed in greater detail below, movable closure 50 is operative to move between a first (closed) position wherein insects in a vicinity of the upstream end 22 are prevented from entering into the housing's interior, to a second (open) position which creates an entryway into the upstream interior region of housing 20. As compression chamber 70 is selectively moved between an uncompressed position (FIG. 1(a)) and a compressed position (FIG. 1(b)), this controls the orientation of movable closure 50.

Figure 7:
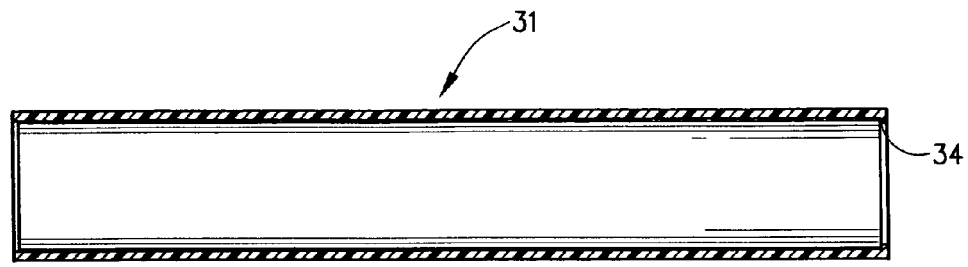
FIG. 7 is a side view in elevation and in cross-section of one of the housing's tubular sections.
Figure 8:
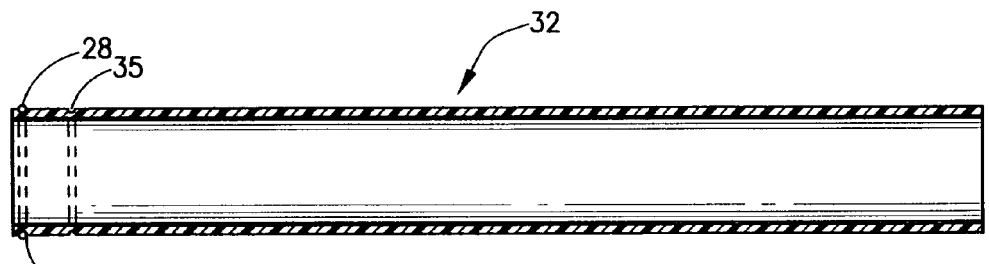
FIG. 8 is a side view in elevation and in cross-section of another of the housing's tubular sections.

In order to allow collection of insects in hard to reach areas, housing 20 is preferably an extensible member so that an effective length thereof may be selectively varied. To this end, housing 20 may include a plurality of plastic tubular sections 30–33 that are matable with one another so that the effective length of housing 20 may be varied. More particularly, housing 20 in this first exemplary embodiment includes a primary housing section 30, first and second extension tube sections 31 and 32 and a collection tube 33. Tubes 31–33 are shown in FIGS. 7–9, respectively.

Figure 2:
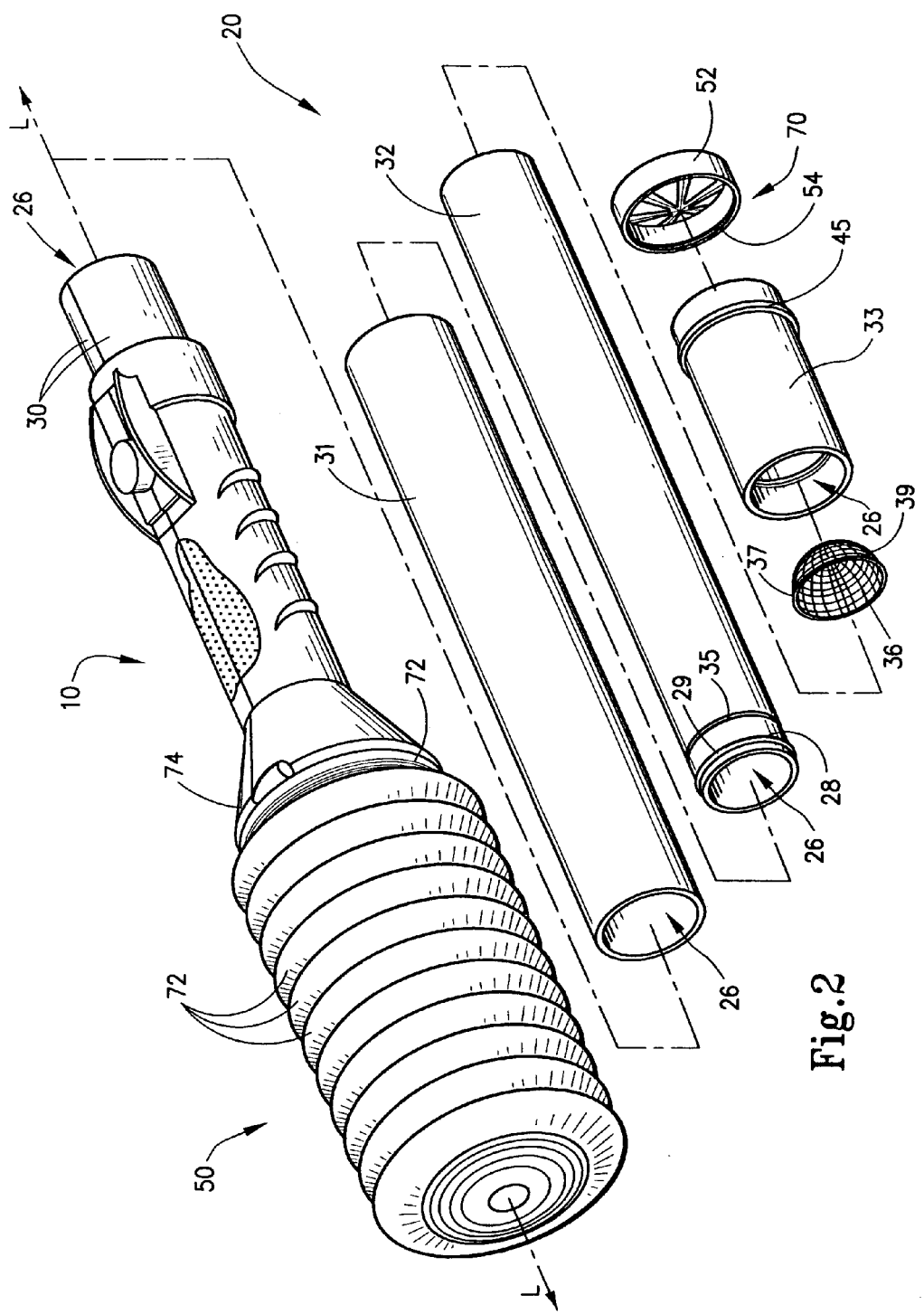
FIG. 2 is an exploded perspective view of the insect collection device of FIGS. 1(a) and 1(b) to show the various tubular housing sections thereof.
Figure 10A:
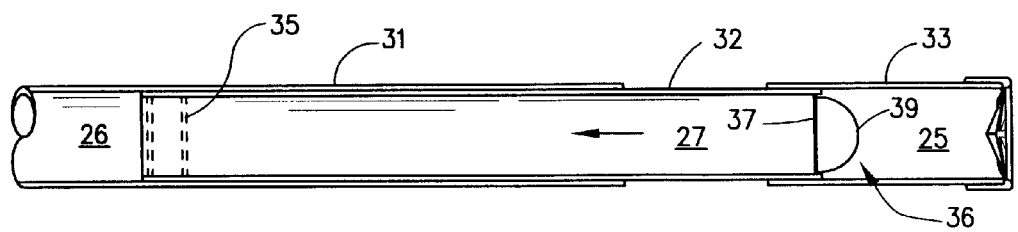
FIG. 10(a) is a side view in cross-section and in elevation of the housing's tubular sections in an assembled state.
Figure 10B:
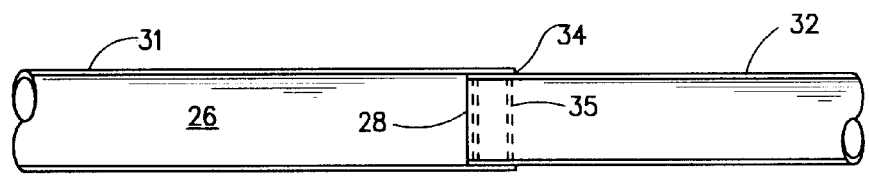
FIG. 10(b) is a side view in cross-section and in elevation of two of the housing's tubular sections shown fully telescoped.

With reference to FIG. 2, first extension tube section 31 has a circular cross section and is telescopically received over an upstream end portion of primary housing section 30 and retained there by frictional engagement. An upstream end of first extension tube 31 is provided with an inner circumferential ridge 34 so that when it is telescopically received over a downstream end portion of second extension tube 32, as shown in FIG. 10(a), and the effective length of tube sections 31 and 32 is increased, as shown in FIG. 10(b), ridge 34 is captured in an outer circumferential groove 35 formed in second extension tube 32 to prevent inadvertent separation during use. Also provided on second extension tube 32 is a circumferential O-ring seat 28 which receives an O-ring 29 to provide for a sealed engagement between tube sections 31 and 32. An upstream end portion of second extension tube 32 may then be telescopically received within collection tube 33 to form the extensible set of extension sections.

Figure 9:
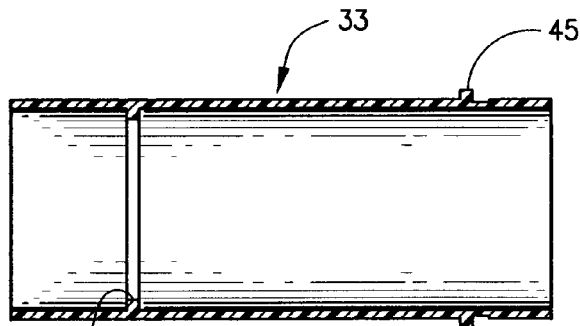
FIG. 9 is a side view in elevation and in cross-section of the housing's collection tube section.

The construction of collection tube 33 may be appreciated with reference to FIGS. 2 and 9. Collection tube 33 may also be a tubular plastic piece having a circular cross-section that is formed to include inner and outer circumferential ridges 44 and 45, respectively. Disposed within collection tube 33 is a partition, preferably in the form of a mesh screen 36 which tapers in the upstream direction. Mesh screen 36 is constructed of an appropriate material, such as an integrally molded plastic piece or stamped aluminum, and preferably includes an annular ring 37 which is sandwiched between inner circumferential groove 44 and the upstream end of extension tube 32 when the device is assembled. Attached to annular ring 37 is a meshing 39 which is impervious to insects. Mesh screen 36 is sized and adapted to be press fit into collection tube 36 so that it does not dislodge once insects are collected and the collection tube is removed.

Figure 11A:
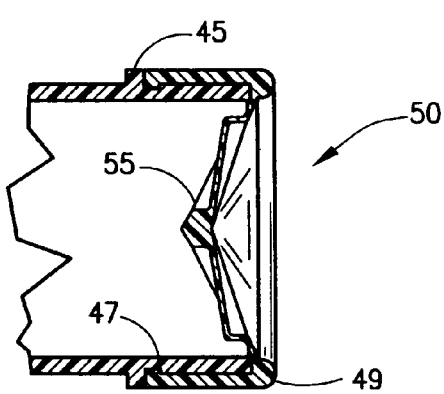
FIGS. 11(a) and 11(b) are cross-sectional views showing an upstream end portion of the insect collection device when the closure member is in the closed position and open position, respectively.
Figure 11B:
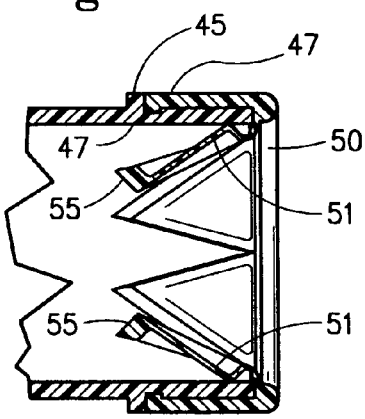

Movable closure 50 in the first exemplary embodiment of the insect collection device 10 of the present invention is formed as an end cap that is disposed over an upstream end portion of collection tube 33. Movable closure 50 is maintained on collection tube 33 by a snap-fit engagement. To this end, as shown in FIGS. 11(a) and 11(b), movable closure 50 includes an annular ring section 49 provided with a lip that is sized and adapted to engage an annular recess 47 formed in collection tube 33 adjacent to outer circumferential ridge 45. As such, movable closure 50 fits snuggly over the upstream end portion of collection tube 33 to prevent dislodgment during use. Once the insect collection device 10 is in the assembled state, as shown in various ones of the figures, mesh screen 36 forms a partition which separates the housing interior 26 into an upstream insect collection region 25 (FIG. 10), generally defined within collection tube 33 between mesh screen 36 and movable closure 50, and a downstream region 27 that is to the left of mesh screen 36 in the figures. The upstream region of the housing, where insects are to be collected, is preferably non-adhering to insects. To this end, and as apparent from the various figures, the inner sidewall in the collection region is devoid of any tacky substance which would otherwise stick to captured insects. Rather, this inner sidewall area is smooth.

Figure 12A:
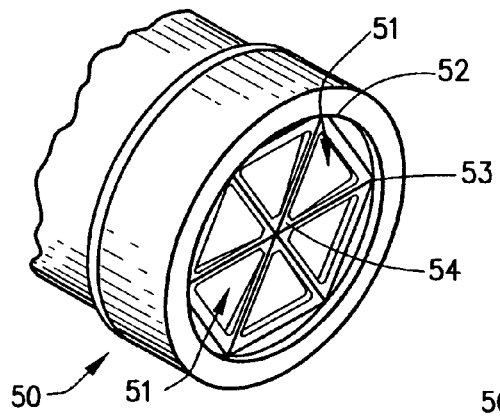
FIGS. 12(a) and 12(b) are perspective views showing the upstream end portion of the insect collection device when the closure member is in the closed position and open position, respectively.
Figure 12B:
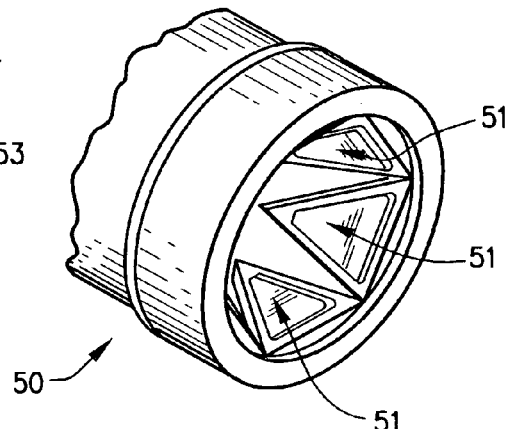
Figure 13A:
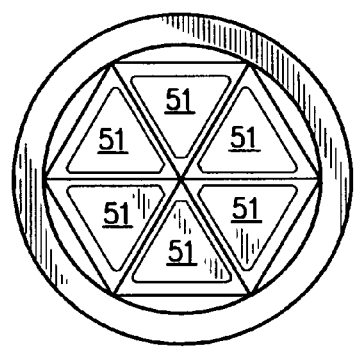
FIGS. 13(a) and 13(b) are upstream end views of the closure member when it is in the closed position and open position, respectively.
Figure 13B:
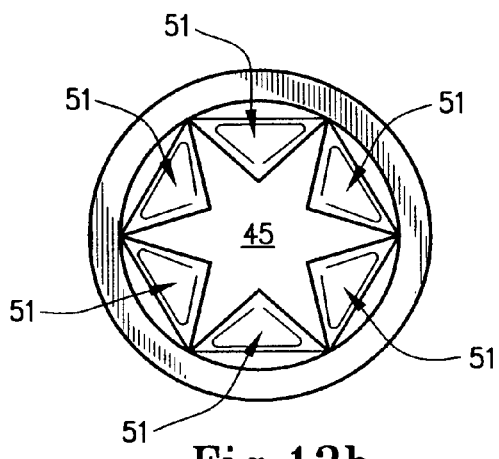

The remainder of the movable closure's construction, and its ability to assume open and closed orientations can now be better appreciated with reference to FIGS. 12(a), 12(b), 13(a) and 13(b). Secured to the annular ring 49 of closure member 50 are a plurality of equiangularly spaced-apart closure flaps 51. Each of closure flaps 51 is a generally triangular and wedge-shaped member having two vertices 52 and 53 secured to an inner surface of annular ring 49 and a free vertex 54. Preferably, movable closure 50 is a one-piece molded plastic construction which has been die cut to form the closure flaps 51. When the closure flaps 51 are in the closed position (FIGS. 12(a) and 13(a)), they resemble a hub and spoke arrangement so that they essentially close off access to the collection region 25 from its upstream end. When in the closed orientation, and as perhaps best shown in FIG. 11(a), bent portions 55 of vertices 54 come together. However, when the vacuum effect is created by insect collection device 10, such that the pressure within the collection region 25 and the housing interior 26 is less than ambient pressure, closure flaps 51 are caused to fan out from one another as shown in FIGS. 11(b), 12(b) and 13(b) into the open position thereby providing an entryway into the collection region 25 as target insect(s) are drawn in. After this happens, and the pressure begins to equalize, closure flaps 51 return to the closed position.

As shown in various one of the figures, compression chamber 70 is preferably in the form of a flexible bellows having a plurality of hinged ribs 72 joined together in an accordion-like manner so that compression chamber 70 can be moved between the uncompressed position and the compressed position. Because a vacuum effect is created in order to effectively capture insects in a vicinity of the housing's upstream end 22, it is preferred to securely attach compression chamber 70 to the downstream end portion 24 of housing 20. To this end, and as shown in FIG. 14, the compression chamber's bellows structure is provided with an upstream neck 73 which is sized and adapted to be placed over the second end portion of housing 20. A securement clamp 74 (FIG. 15) is formed as a metallic ring that is sized to be placed over the compression chamber's neck 73 once the neck is received over the housing's first end portion. Securement clamp 74 is provided at one end thereof with a screw 75 which is adapted to threadedly engage a cooperative socket 76 formed on an opposing circumferential end of the securement clamp 74, as known in the art. In this manner, the tendency for the compression chamber 70 to become detached from the housing 20 upon use of insect collection device 10 is reduced. However, the ordinarily skilled artisan should readily appreciate that compression chamber 70 could be attached to housing 20 in a variety of different manners other than that described herein. In any event, though, it is preferred that compression chamber 70 be capable of securely, yet releaseably, attaching to the housing 20 so that the insect collection device 10 may be easily cleaned and reassembled as desired.

Figure 3A:
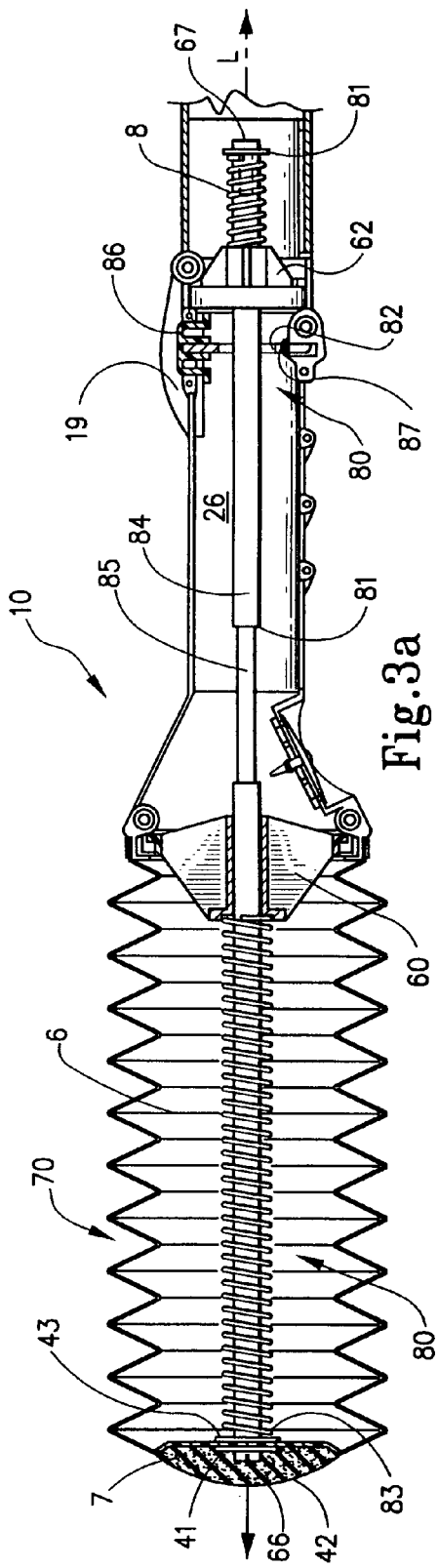
FIG. 3(a) is a partial right side view in elevation and in cross-section of the insect collection device when it is in the relaxed state.
Figure 3B:
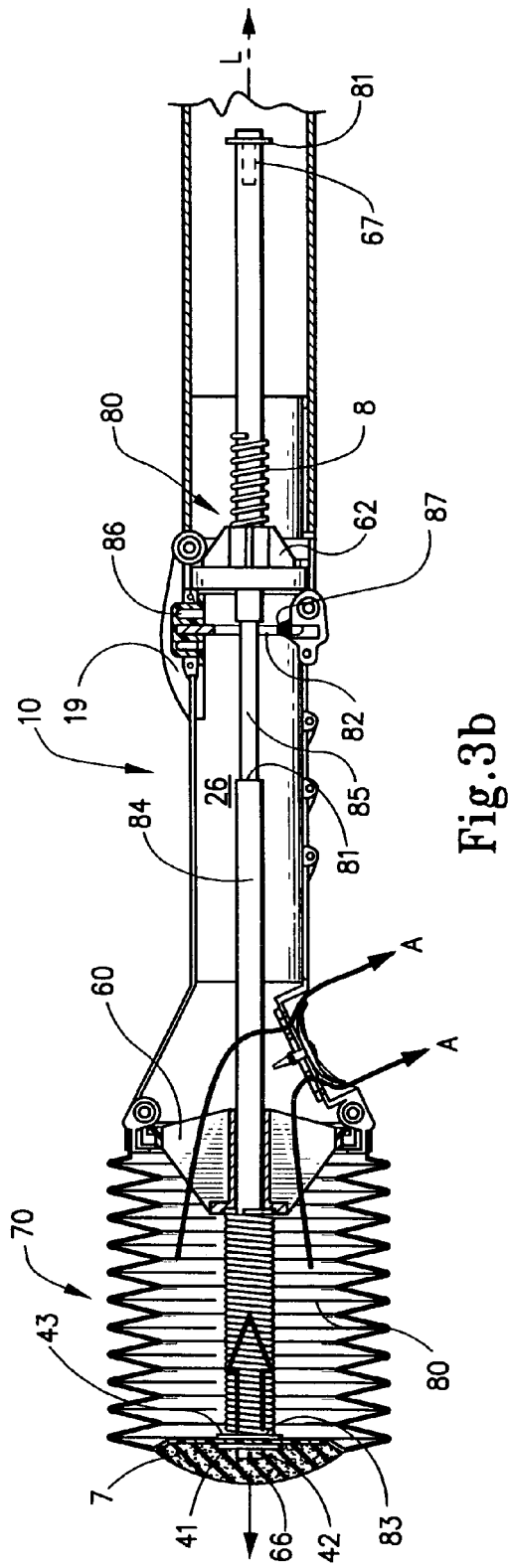
FIG. 3(b) is a partial right side view in elevation and in cross-section view of the insect collection device when it is in the ready state.
Figure 5A:
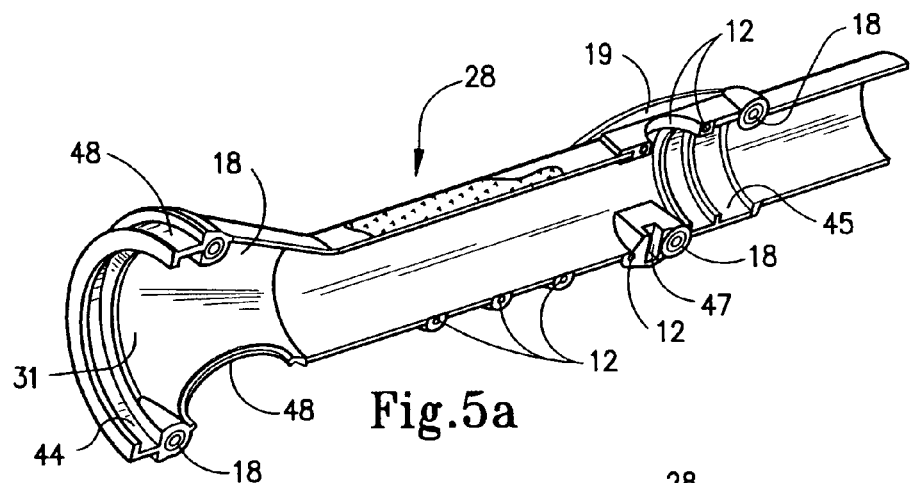
FIGS. 5(a) and 5(b) are each perspective views of the primary housing section's left housing piece.
Figure 5B:
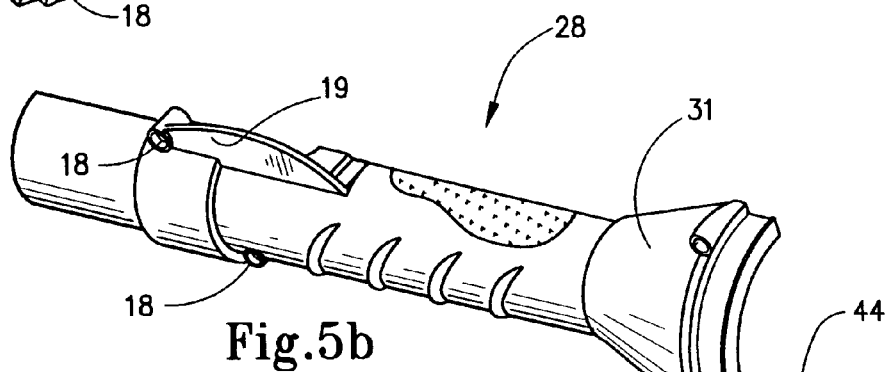
Figure 6A:
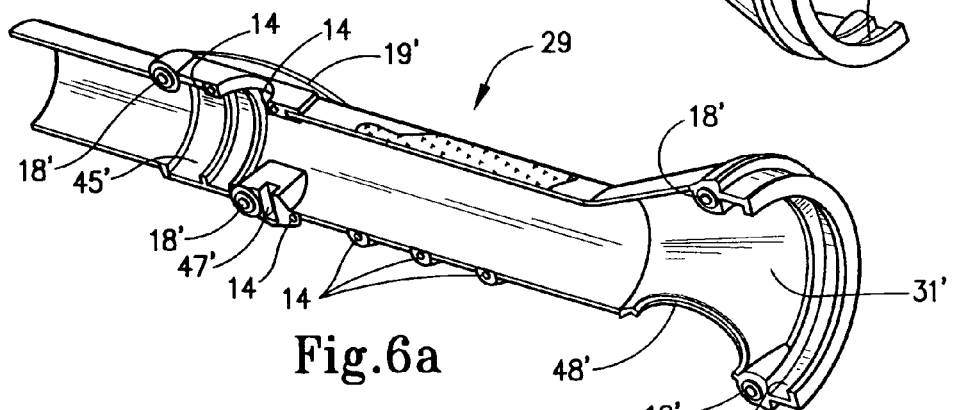
FIGS. 6(a) and 6(b) are each perspective views of the primary housing section's right housing piece.
Figure 6B:
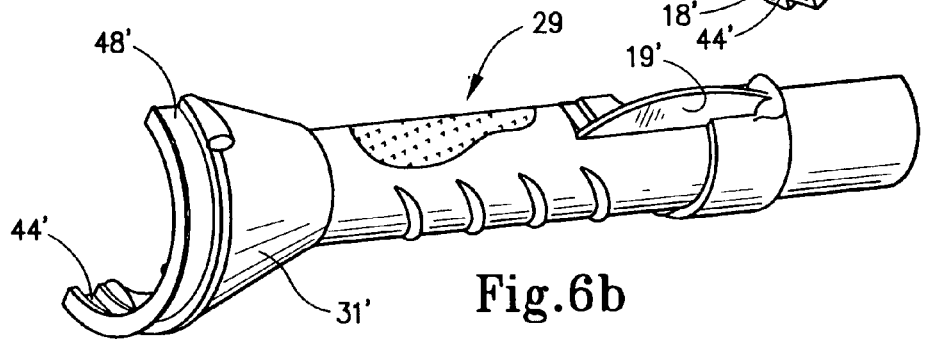

FIGS. 3(a) and 3(b) respectively show insect collection device 10 in a relaxed configuration wherein compression chamber 70 is in the uncompressed position, and a ready configuration wherein compression chamber 70 is in the compressed position. As may also be seen in these figures, insect collection device 10 includes a triggering assembly 80 which is mechanically coupled to compression chamber 70 and is operative when placed in an engaged state (FIG. 3(b)) to retain compression chamber 70 in the compressed position. Triggering assembly 80 is also operative upon activation by a user to move from the engaged state to a disengaged state (FIG. 3(a)) and thereby allow compression chamber 70 to return to the uncompressed position. Triggering assembly 80 broadly includes a metallic plunger shaft 84 that is movable with compression chamber 70 between a retracted position when compression chamber 70 in the uncompressed position, and an armed position when compression chamber 70 is in the compressed position.

Triggering assembly 80 also includes a trigger button 86 and its associated trigger switch 82 which operates to engagedly retain plunger shaft 84 in the armed position. Plunger shaft 84 is disposed entirely within insect collection device 10 and travels longitudinally along its central longitudinal axis "L". A proximal end 83 of plunger shaft 84 is secured to the butt end 77 of compression chamber 70 via a fastening screw 42 which extends through a pair of spaced-apart metallic washers 41 and 43 as well as a central bore 85 (FIG. 14) formed in the downstream end of bellows 70, such that a portion of the bellows is sandwiched therebetween. A corresponding bore (not shown) is also formed in the proximal end portion of plunger shaft 84 so that fastening screw 42 may be threadedly received therein. A resilient bellows pad 66 is then attached, such as via an acrylic adhesive, to the recess formed in the downstream end of compression chamber 70. As shown in FIG. 16, bellows pad 66 is provided with concentric cylindrical cut-outs 65 and 67 which are, respectively, sized and adapted to accommodate the head of fastening screw 42 and washer 41. As such, bellows pad 66 provides a cushioned contact surface for a user's palm as he/she manually urges compression chamber 70 in the direction of the enlarged arrow in FIG. 3(b) so that it moves into the compressed position.

Figure 17:
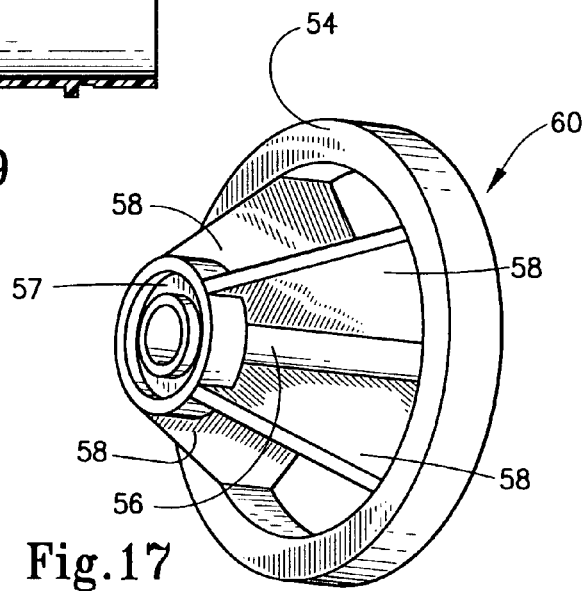
FIG. 17 is a enlarged perspective view of the insect collection device's first plunger shaft bearing guide.

Plunger shaft 84 extends from its proximal end within the housing interior 26 along central longitudinal axis "L" to terminate at a plunger shaft distal end. A pair of longitudinally spaced apart plunger shaft bearing guides 60 and 62 are fixedly disposed relative to primary housing section 30 and serve to both rigidify the internal assemblage and provide guide ways for plunger shaft 84 as it travels in the longitudinal direction. First plunger shaft bearing 60 is shown in FIG. 17 as an integral plastic construction which includes a collar 54 which is concentric with a tubular section 56 and joined thereto by a plurality of equiangularly spaced apart fins 58. When in the assembled state, fins 58 are orientated so that they converge toward longitudinal axis "L" in the downstream direction. Tubular section 56 provides a first passageway through which plunger shaft 84 is received. When assembled, a first coiled compression spring 6 is seated between washer 43 and a downstream facing surface 57 of first plunger shaft bearing guide 60 in order to bias compression chamber 70 into the uncompressed state.

Second plunger shaft bearing guide 62 is also fixedly disposed within primary housing section 30 upstream of trigger switch 82 and, as shown in FIG. 18, also includes an associated collar 61, tubular section 63 and fins 64, such that associated tubular section 63 provides a second passageway for a corresponding portion of plunger shaft 84. A second compression spring 8 is disposed for compression between an upstream end 69 of second plunger shaft bearing guide 62 and a metallic washer 81 that is attached to the upstream end of plunger shaft 84 via an appropriate fastening screw 67. Second compression spring 8 serves the purpose of preventing the upstream end of plunger shaft 84 from traveling in the downstream direction beyond second plunger shaft bearing guide 62 as the plunger shaft moves from the armed position to the retracted position.

Figure 19:
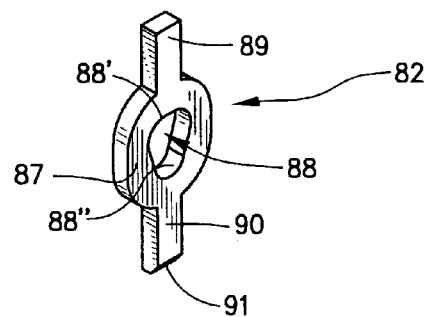
FIG. 19 is a perspective view of the insect collection device's trigger switch.

Trigger switch 82 is also disposed within housing interior 26 and extends transversely to longitudinal axis "L". The construction of trigger switch 82 is shown in FIG. 19 and an integral piece having a central annular portion 87 provided with a lobe-shaped opening 88 and a pair of oppositely projecting legs 89 and 90. Lobe-shaped opening 88 has an enlarged region 88' which is sized and adapted to accommodate the larger cross-section region of plunger shaft 84, and a reduced region 88" which is sized and adapted to accommodate a medial portion 85 of plunger shaft 84 that is of reduced thickness. As also shown in FIG. 19, lower leg 90 of trigger switch 86 has a tapered end 91 to facilitate movement of the trigger switch 86 during use.

Having discussed various aspects of the general construction for insect collection device 10, the assemblage thereof can now be better appreciated. Conveniently, primary housing section 30 is formed, as shown in FIGS. 5(a)–6(b), by matable pairs of primary housing pieces 28 and 29 to facilitate the assembly process. Each of these pieces 28 and 29 has an outwardly flared downstream portion 31 and 31', respectively, so that when they are assembled housing section 30 has a generally conical portion sized and adapted to accommodate the neck 72 of compression chamber 70 and first bearing guide 60. Once the plunger shaft's proximal end has been fastened to the butt end of the compression chamber, and the bellows pad adhered to the compression chamber 70, the remainder of the assemblage can proceed as follows. Plunger shaft 84 can then be passed through first compression spring 6 and first plunger shaft bearing guide 60 so that first compression spring 6 is seated between washer 43 and seat 57. Then, the plunger shaft 84 is passed through the lobe-like opening 88 of trigger switch 82 as well as second plunger shaft guide bearing 62 and second compression spring 8. As appreciated with references to FIGS. 4 through 6(b), primary housing section pieces 28 and 29 are then appropriately positioned about this internal assemblage so that the collar 54 of first plunger shaft bearing guide 60 is aligned with opposed arcuate grooves 44 and 44' formed in housing pieces 28 and 29, respectively. Similarly, second plunger shaft bearing guide 62 is appropriately positioned so that its collar 61 is aligned with opposed arcuate grooves 45 and 45'. A triggering spring 87 is then placed over lower trigger arm 90 and trigger button 86 is placed over upper arm 89. This sub-assemblage is then positioned so that lower arm 90 is seated within corresponding cut out sections 46 and 46' formed in housing piece sections 28 and 29, respectively, while the cap of trigger button 86 is passed through opposed arcuate cut outs 47 and 47' until the brim of trigger button 86 is resiliently urged into contact with the inner surfaces of pieces 28 and 29 by virtue of the restorative force of triggering spring 87. A purge valve 78 (FIG. 20) is then passed through its associated purge valve ring 79 (FIGS. 21(a) and 21(b)) that has a hub and spoke-like construction. The purge valve ring 79 is then positioned within purge valve seat portions 48 and 48' formed in pieces 28 and 29, respectively.

Once the internal triggering assembly 80 is assembled and positioned, such as in the manner discussed above, opposed primary housing section pieces 28 and 29 can then be mated with one another by press fitting them together such that the various alignment holes 12 associated with left housing piece 28 register with correspondingly positioned nubs 14 formed in second piece 29. Pieces 28 and 29 may then be securely fastened together with securement screws 16 which threadedly engage aligned openings 18 and 18' formed in pieces 28 and 29, respectively. The neck 73 of bellows 70 can then be placed over collar sections 48 and 48' associated with first and second pieces 28 and 29, respectively, and thereafter secured through the use of the securement clamp 74 as discussed above. As desired, one or more tubular extensions can then be selectively attached to primary housing section 30, as well as the assembled collection member 50 as also discussed hereinabove.

Once assembled, insect collection device 10 is ready for use. In operation, an individual prepares insect collection device 10 for use by grasping primary housing section 30 with one of his/her hands. Knurling and finger recesses are provided for added comfort. Using the palm of his/her other hand, the user then compress bellows 70 against the restorative force of spring 6 into the compressed position of FIG. 1(b). This causes a corresponding movement of plunger shaft 84 in the upstream direction until the notched medial portion 85 of plunger shaft 84 which has a reduced thickness begins to pass through lobe-like opening 88 of trigger switch 82. The upward bias on trigger spring 87 then urges lobe-like opening 88 into contact with medial portion 85 so that medial portion 85 is seated within lower lobe portion 88" of trigger 82. During this compression, air escapes through the purge valve 78 in the direction of arrows "A" in FIG. 3(b) and the distance between the movable closure 50 and the downstream end portion of housing 20 remains unchanged during evacuation of air from the housing 20. This allows the insect collection device 10 to be placed in the armed state without pressurizing the interior and without causing movable closure 50 to be inadvertently placed in the open position. The user can then relieve pressure on bellows 70 and the restorative force of spring 6 urges the shoulder of plunger shaft 84 into engagement with arm 90. At this point, insect collection device 10 is in a ready state with triggering assembly 80 correspondingly in an engaged position.

Once the user approaches a target insect whereby the upstream end 22 of housing 20 is positioned in close proximity to the target insect, the user depresses trigger button 86, thereby dislodging trigger 82 from medial portion 85. Trigger guards 19 and 19' are provided on housing pieces 28 and 29 to help prevent inadvertent activation of the device prior to use. The restorative force of spring 6 then causes a vacuum effect within the housing interior as compression chamber 70 returns to the uncompressed state along with the corresponding movement of plunger shaft 84 to the retracted position. This vacuum effect urges closure 50 into the open position and, at the same time, draws the target insect into collection tube 33. As the suctioning effect reduces and the pressure within housing interior 26 begins to equalize with the ambient pressure, closure 50 is restored to its closed position, thereby confining the captured insect within collection tube 33 between screen 36 and closure 50. The length of the housing from the compression chamber 70 to the upstream end portion of housing 20 remains unchanged during creation of air pressure within the upstream region 25. At this point, if desired, the process can be repeated to capture additional insects which can be viewed through collection tube 33 by virtue of its transparency.

Figure 22:
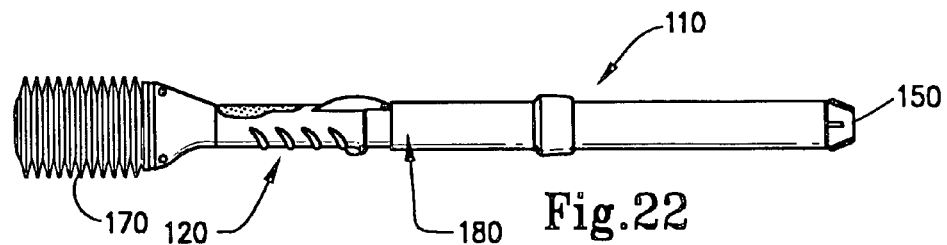
FIG. 22 is a right side view in elevation of a second exemplary embodiment of an insect collection device for accomplishing the methodology of the present invention.

A second exemplary embodiment of the insect collection device of the present invention will now be described with reference to FIGS. 22–36. Insect collection device 110 is generally introduced in FIG. 22 and, as with insect collection device 10 discussed above, comprises a housing 120, a movable closure 150, a compression chamber 170 and a triggering assembly 180. Insect collection device 110 is constructed similarly to insect collection device 10 discussed above, with the exception that its upstream portion is somewhat different. Accordingly, only those portions of insect collection device 110 which differ from that discussed above with reference to the first exemplary embodiment will be described.

Figure 23:
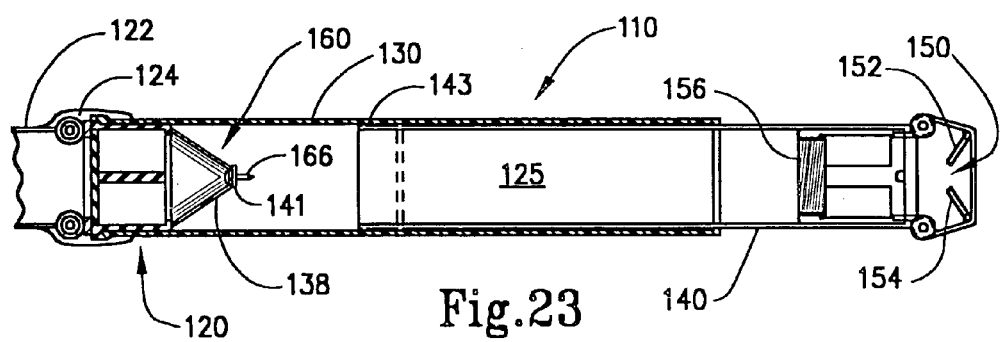
FIG. 23 is a right side view in elevation and in cross-section showing an upstream region for the insect collection device of FIG. 22.
Figure 27:
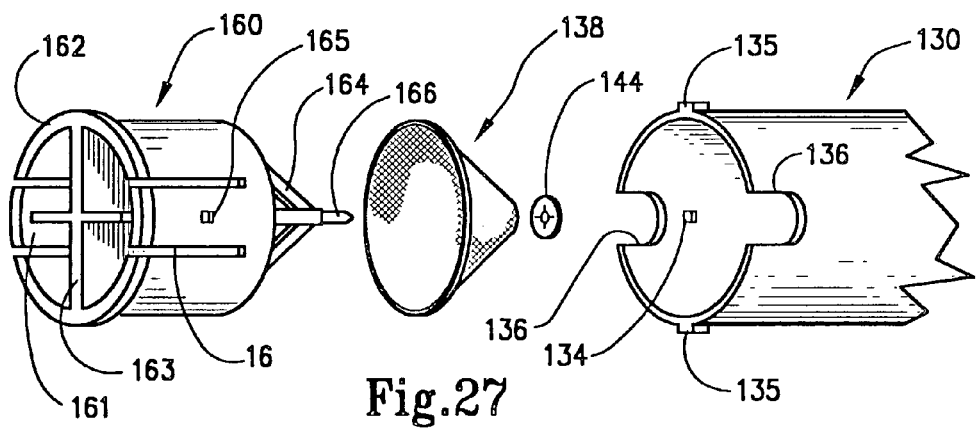
FIG. 27 is an exploded perspective view to illustrate the screen mount's attachment to the tubular section of FIG. 24.
Figure 24:
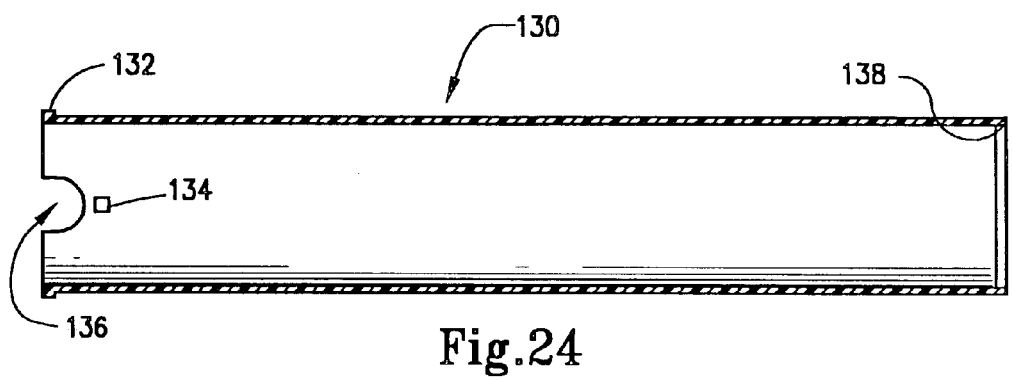
FIG. 24 is a right side view in elevation and in cross-section of one of the housing's tubular sections.
Figure 25:
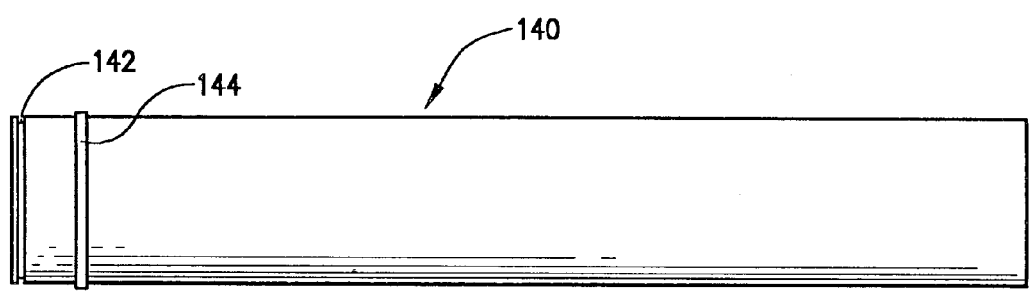
FIG. 25 is a right side view in elevation of another of the housing's tubular sections.
Figure 26:
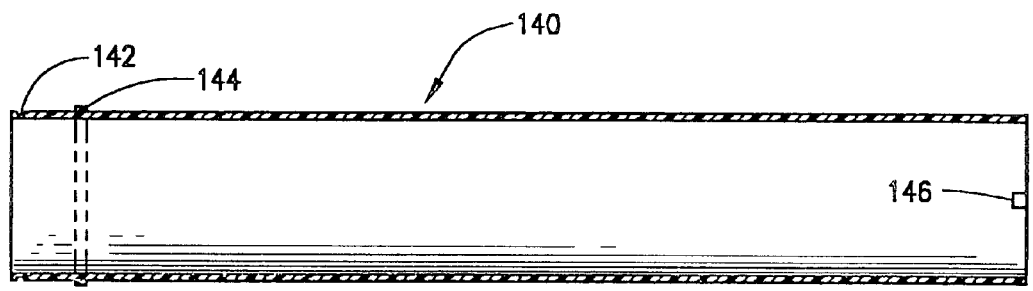
FIG. 26 is a right side view in elevation and in cross-section of the tubular section of FIG. 25.

The upstream portion of insect collection device 110, when in the fully assembled state, is shown in FIG. 23. Housing 120 includes a pair of tubular and telescopically received housing sections 130 and 140. As shown in FIG. 24, first tubular housing section 130 is provided with an inner circumferential ridge 138 at its upstream end. As shown in FIG. 25, second tubular housing section 140 is provided with an outer circumferential groove 142 and an outer circumferential ridge 144 along its downstream end portion so that when first tubular section 130 is telescopically received over second tubular section 140 as shown in FIG. 23, ridge 144 provides a limit stop for the extensible set as they are telescopically extended to their full length wherein it comes into contact with inner circumferential ridge 138. Also as before, an O-ring 143 is seated within outer circumferential groove 142 to provide a sealed engagement between the two housing sections. In this regard, the construction of the upstream portion of insect collection device 110 is similar to that discussed above with reference to the first embodiment.

Figure 28:
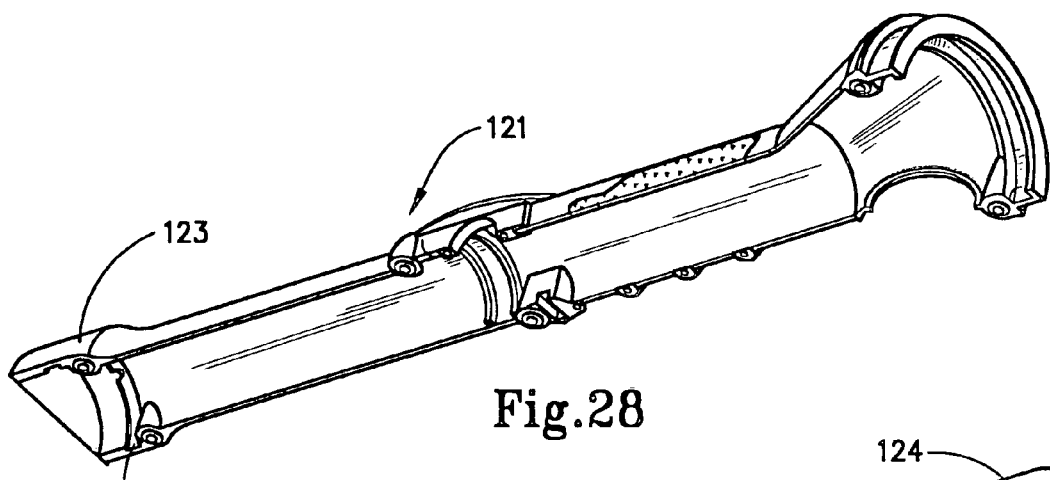
FIG. 28 is a perspective view of the primary housing section's right housing piece in the second exemplary embodiment.
Figure 29:
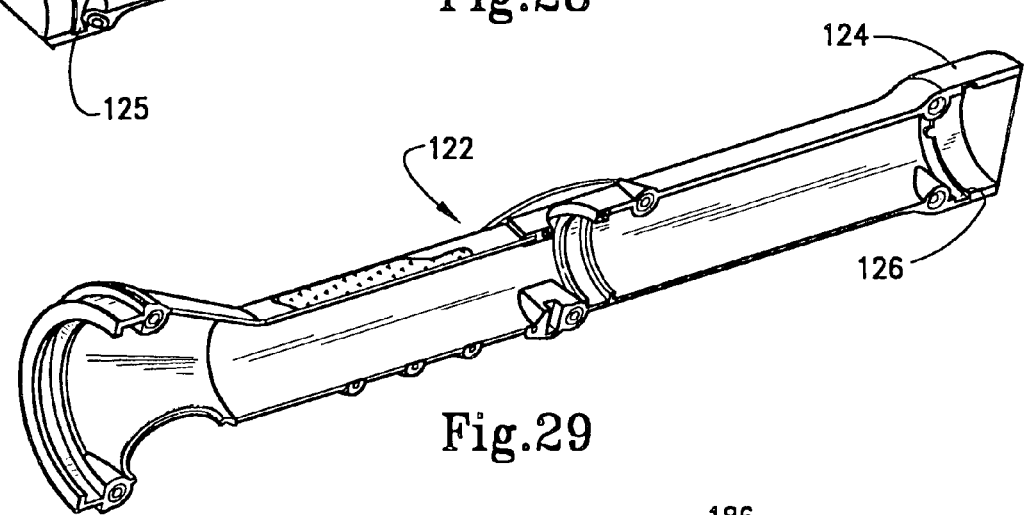
FIG. 29 is a perspective view of the primary housing section's left housing piece in the second exemplary embodiment.

As shown in FIGS. 28 and 29, however, the two pieces 121 and 122 of primary housing section 120 have their upstream ends constructed somewhat differently. Namely, these upstream ends 123 and 124 are enlarged and, respectively, provided with grooved portions 125 and 126 so that a screen mount 160 can be seated therein when insect collection device 110 is in the assembled state. With reference again to FIG. 23, screen mount 160 is formed to include a screen profile which supports a tapered mesh screen 138 that is impervious to insects as they are drawn into collection region 125. The construction of the various pieces for the screen mounting sub-assembly may be best appreciated with reference to FIGS. 27 and 36. Screen mount 160 has a generally cylindrical main body provided with a generally circuitous brim 162 which is sized and adapted to engage grooved portions 125 and 126, respectively, of housing pieces 121 and 122 when in a mounted state so that screen mount 160 is fixedly positioned within an interior of insect collection device 110. A plurality of converging support posts 164 project from an opposing end of the main body of screen mount 160 to form the screen mount. Posts 164 supportably position a prong element 166. It should be noted that screen mount 160 is preferably constructed as a unitary piece of plastic material. A pre-formed, tapered mesh screen 138 having an aperture (not shown) is then sized and adapted to be placed over prong element 166 so that it drapes over these support posts 164. Screen 138 is held in this position by a notched clip mount 141.

A downstream end portion of tubular section 130 is attached to screen mount 160 via snap fit engagement prior to being clamped between primary housing pieces 121 and 122. More particularly, tubular section 130 is formed to include a pair of opposed arcuate cut outs 136 so that when a user grasps screen mount 160, finger tabs 161 thereof may be aligned with cut outs 136 to allow screen mount 160 to be inserted into tubular section 130. Thereafter, the user can then grasp cross piece 163 and press fit screen mount 160 into engagement with tubular section 130 whereby protrusions 165 snap into engagement with corresponding notches 134 formed on an inner surface of tubular section 130. With reference again to FIG. 23, screen mount 160 can be easily ejected from tubular section 130 by driving inner telescoping tubular section 140 in the downstream direction to separate the engagement of protrusions 165 from notches 134.

Figure 30:
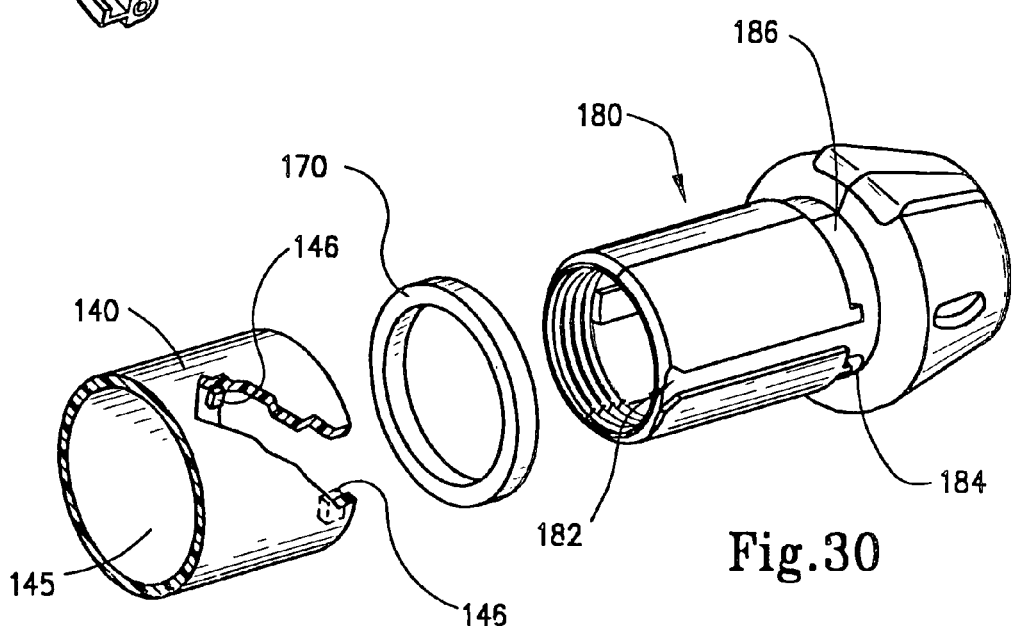
FIG. 30 is an exploded perspective view to illustrate the attachment of the collection nozzle to the tubular sections of FIGS. 25 and 26.

A bayonet connection is employed to fixedly mount movable closure 150 to nozzle section 180. As shown in FIG. 30, second tubular section 140 is also provided with a pair of opposed protrusions 146 which are alignable with channels 182 associated with nozzle 180, whereby the tubular portion of nozzle 180 can be inserted within second tubular section 140 and rotated so that protrusions 146 become locked into notches 184 associated with nozzle 180. A compressible ring 170 may also be placed over nozzle 180 so that it is seated within collar 186 to provide a sealed engagement between nozzle 180 and an inner sidewall surface 145 of second tubular section 140 when they are mated.

Figures 31, 32:
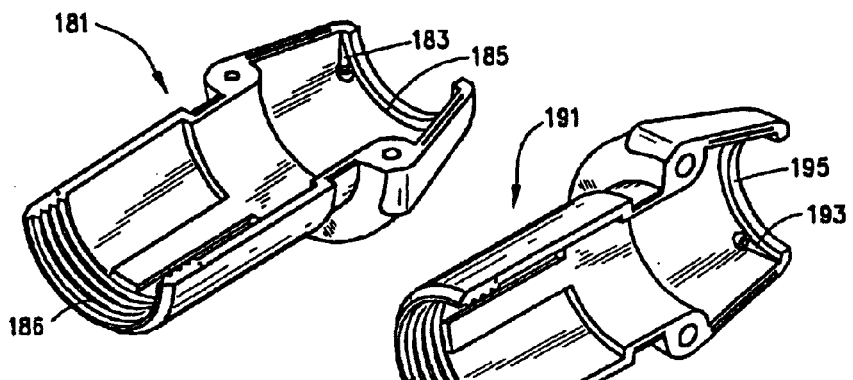
FIG. 31 is a somewhat enlarged perspective view of the collection nozzle's left piece.
FIG. 32 is a somewhat enlarged perspective view of the collection nozzle's right piece.
Figure 33:
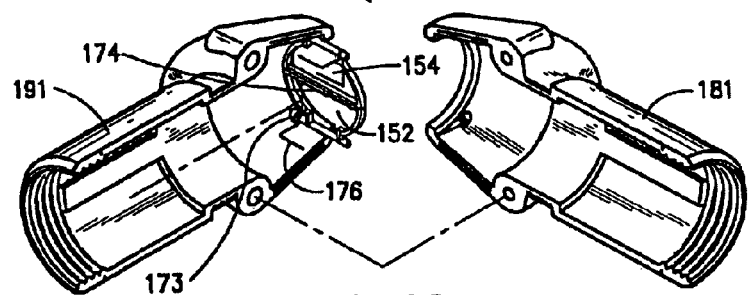
FIG. 33 is an exploded perspective view to illustrate the mounting of the closure member's trap doors to the collection nozzle.
Figures 34, 35, 36:
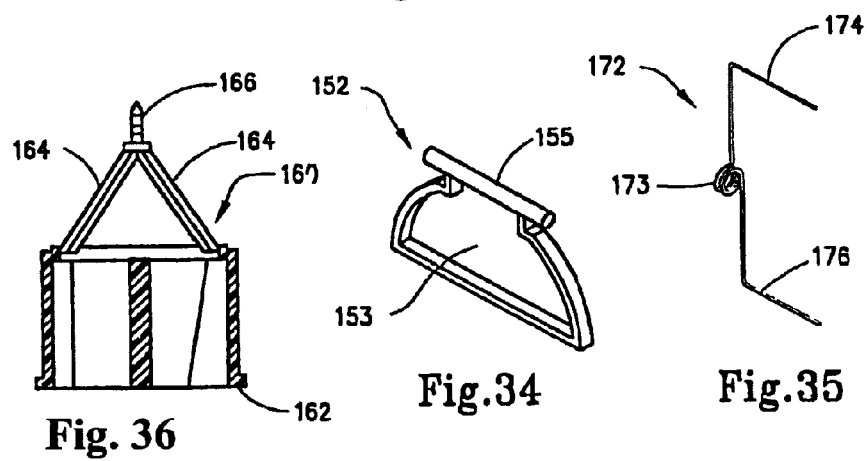
FIG. 34 is a perspective view of a representative one the closure member's trap doors.
FIG. 35 is an enlarged perspective view of a representative one of the spring clasps for use in attaching the trap door of FIG. 34 in the manner shown in FIG. 33.
FIG. 36 is an cross-sectional view in elevation of the screen mount.

As shown in FIGS. 31–33, nozzle 180 is formed by a pair of matable pieces 181 and 191 which mount movable closure 150. Reference will now be made to FIGS. 31–35 to describe the mounting assembly for movable closure 150. Movable closure 150 includes a pair of trap doors 152 and 154 which are mounted between nozzle pieces 181 and 191. A representative one of these doors 152 is shown in FIG. 34 to include an arcuate door panel 153 and a door hinge 155 having protruding ends. It should be appreciated, of course, that second door 191 has an identical construction. Each of doors 152 and 154, when in the mounted state, are resiliently biased into a closed position through the provision of an associated clip spring, such as clip spring 172 shown in FIG. 35. More particularly, and with reference to door 152, its associated spring 172 is placed such that its looped portion 173 is disposed about one leg of hinge 155. These are then aligned with a shaft hole 183 formed in first nozzle piece 181 so that when door 152 is mounted as shown in FIG. 33, an upper leg 174 of spring clip 172 rests against face panel 153, while a lower leg 176 of spring clip 172 rests against an inner surface of nozzle piece 181. Wall sections 185 and 195 are formed as part of nozzle pieces 181 and 191 to prevent first door 152 from swinging open outwardly beyond the opened position. Second door 154 is mounted between nozzle pieces 181 and 191 in a like manner. As such, it can be appreciated that doors 152 and 154 are resiliently biased into their closed position, yet permitted to swing into an open position upon creation of the vacuum effect discussed above with reference to the first exemplary embodiment for the insect collection device 10 of the present invention. Target insects are then drawn into collection region 125 where they are maintained between partition screen 138 and the trap doors. As may also be seen in various ones of the figures for this second exemplary embodiment for the insect collection device 110, nozzle 180 has internal threads 186 and 196 formed on its nozzle pieces 181 and 191. This allows a user, if desired, to threadedly attach a correspondingly threaded vessel within which the captured insect(s) are drawn and then trapped by replacing nozzle 180 with an appropriate closure cap.

Figure 37:
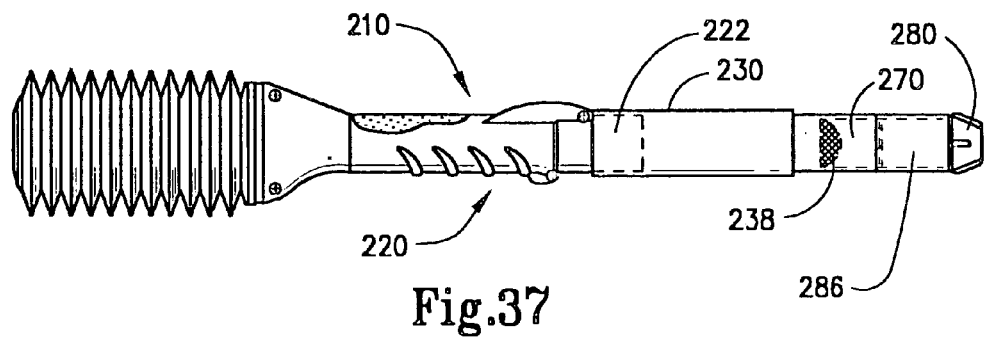
FIG. 37 is a right side view in elevation of a third exemplary embodiment of an insect collection device for accomplishing the methodology of the present invention, and showing portions thereof in phantom.

A third exemplary embodiment of an insect collection device according to the present invention is shown in FIG. 37. As before, the discussion of insect collection device 210 will be confined to those portions which differ from embodiments discussed hereinabove. In insect collection device 210, that portion of primary housing section 220 which is upstream of trigger guard 219 has simply a tubular construction 222 which is telescopically received within first tubular section 230. FIG. 37 also shows second tubular section telescopically received within first tubular section 230, as discussed above. Here, however, a collection vessel 270 has its neck 272 threadedly attached to the tubular portion 286 of nozzle 280. Vessel 270 has an open bottom and an inserted mesh screen 238 as described with reference to the first embodiment. The interior of vessel 270, thus, provides the confined collection region for the insects, thereby eliminating the need for the screen mount assembly discussed above with reference to the second exemplary embodiment.

Figure 38:
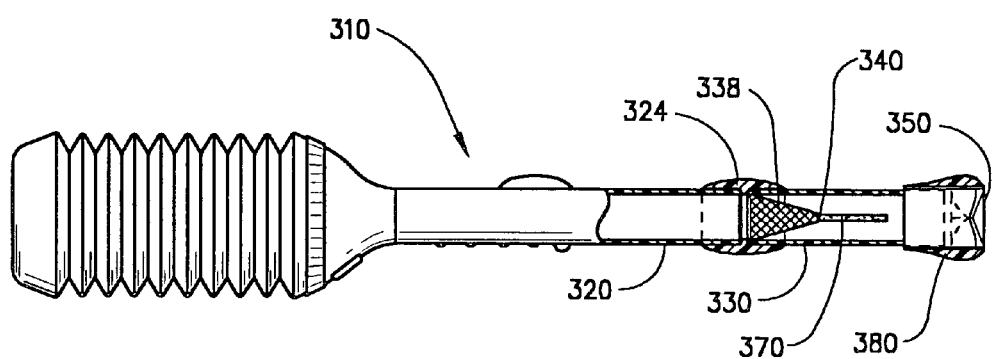
FIG. 38 is a right side view in elevation and in partial cross-section of a fourth exemplary embodiment of an insect collection device for accomplishing the methodology of the present invention.

In FIG. 38, a fourth exemplary embodiment of the insect collection device of the present invention is shown. Here, insect collection device 310 has its primary housing section 320 joined to tubular section 330 by a coupler 324 which surrounds an upstream end portion of primary housing section 320 and a downstream end portion of tubular section 330. Necessarily, then, coupler 324 has opposed openings within which primary housing section 320 and tubular section 330 may be inserted in a close-fitting, mated engagement. In a similar manner, an upstream end collar 380 telescopically receives an upstream end portion 330 and mounts the trap doors of movable closure 350 in a manner such as that discussed above with reference to the second exemplary embodiment. Also shown in this fourth exemplary embodiment is a mesh screen 338 which is formed by integrally molding tubular section 330 so that it is provided with a tapering basket weave section from which extends a prong 340 which supports a wick 370 that can be coated in any appropriate manner with insecticide to exterminate captured insects.

Having discussed the various exemplary embodiments for the construction of the insect collection device of the present invention, it should be readily appreciated that each of these constructions allows for a method to be repeatedly employed to capture insects for inspection and subsequent removal or extermination without risk of escape. This method entails the provision of an elongated housing having a sidewall which extends between upstream and downstream ends to substantially surround a housing interior. The housing is constructed to permit air to flow between the upstream and downstream ends while impeding passage of insects therebetween. A movable closure is provided at an upstream end portion of the housing and biased into a closed position which hinders access to the interior through the upstream end. Air is evacuated through the sidewall at in downstream end region of the housing, thereby establishing a potential vacuum source within the housing interior. In a preferred embodiment, a purge valve is provided and movably disposed over a purge opening formed through the housing's sidewall,. Air is evacuated through this purge opening, thereby establishing the potential vacuum source within the housing interior.

The movable closure is preferably then placed proximate to a target insect(s) and air pressure is created within the upstream region that is less than ambient pressure at the upstream end, whereby ambient air is drawn into the housing interior at a sufficient flow to cause the movable closure to move into an open position. This creates an entryway into the upstream region from the upstream end and draws the insect into the upstream region where it is trapped when the closure returns to the closed position.

A compression chamber may be provided at a downstream end portion of the housing, whereby the step of evacuating air from the housing is accomplished by compressing the chamber into a compressed position. It is preferred that the compression chamber be mechanically maintained in the compressed position and resiliently biased into an uncompressed position. Creation of the air pressure differential can then be accomplished by allowing the compression chamber to return to the uncompressed position.

Accordingly, the present invention has been described with some degree of particularity directed to the exemplary embodiment of the present invention. It should be appreciated, though, that the present invention is defined by the following claims construed in light of the prior art so that modifications or changes may be made to the exemplary embodiments of the present invention without departing from the inventive concepts contained herein.

I claim:

1. A method of capturing insects, comprising:
    (a) providing an elongated housing having an affective length and a sidewall which extends between an upstream end and a downstream end to substantially surround a housing interior, said housing constructed to permit airflow between said upstream end and said downstream end, while impeding passage of insects therebetween;
    (b) providing a movable closure at an upstream end portion of said housing, with said movable closure being biased into a closed position hindering access to the housing interior through said upstream end;
    (c) evacuating air from said housing, while retaining the movable closure in the closed position, thereby to establish a potential vacuum source within the housing interior;
    (d) placing said movable closure proximate to a target insect; and
    (e) creating air pressure within the upstream end portion of said housing that is less than ambient pressure at the upstream end whereby ambient air is drawn into the housing interior at a sufficient flow to cause said movable closure to move into an open position to thereby te create an entryway into the upstream rigion from the upstream end and to draw the insect into the upstream region to be trapped therein when the movable closure returns to the closed position.

2. A method according to claim 1 including providing a compression chamber at a downstream end portion of said housing, and
    whereby the step of evacuating air from said housing is accomplished by compressing said compression chamber into a compressed position.

3. A method according to claim 2 whereby creation of air pressure within the upstream end portion of said housing that is less than ambient pressure is accomplished by returning said compression chamber to an uncompressed position.

4. A method according to claim 2 including resiliently biasing said compression chamber into an uncompressed position.

5. A method according to claim 2 including mechanically maintaining said compression chamber in the compressed position.

6. A method according to claim 5 whereby said compression chamber is maintained in the compressed position by mechanically coupling it to a triggering assembly to define an engaged state for the triggering assembly.

7. A method according to claim 2 comprising restricting evacuation of the air through the upstream end of said housing during compression of said compression chamber.

8. A method according to claim 1 whereby evacuation of air from the housing is accomplished before the movable closure is placed proximate to the target insect.

9. A method according to claim 1 whereby the effective length of said housing is maintained during step (e).

10. A method according to claim 1 whereby said movable closure is mechanically retained in the closed position during evacuation of air from said housing.

11. A method according to claim 1 whereby said movable closure is restricted from moving outwardly in an upstream direction, yet is adapted to move inwardly in a downstream direction as it moves into the open position.

12. A method according to claim 1 whereby the air is evacuated through a downstream region of said housing.

13. A method according to claim 12 whereby the air is only evacuated through said downstream region.

14. A method according to claim 1 comprising permitting unconstrained movement of the insect within the upstream end portion after capture.

15. A method according to claim 14 comprising releasing the insect into ambient air after capture.

16. A method according to claim 1 comprising releasing the insect into ambient air after capture.

17. A method according to claim 1 wherein said upstream end portion includes a removable collection tube, and comprising removing said collection tube and releasing the insect into ambient air after capture.

18. A method of capturing insects, comprising:
   (a) providing an elongated housing having a sidewall which substantially surrounds a housing interior and which is partitioned into an upstream region and a downstream region, whereby airflow is permitted between said upstream and downstream regions while passage of insects therebetween is impeded;
   (b) providing a movable closure at an upstream end portion of said housing, with said movable closure being biased into a closed position to hinder access to said upstream region from said upstream end;
   (c) providing a compression chamber at a downstream end portion of said housing;
   (d) evacuating air through said sidewall at the downstream region of said housing by compressing said compression chamber into a compressed position, thereby to establish a potential vacuum source within the housing interior;
   (e) placing said movable closure proximate to a target insect; and
   (f) creating air pressure within the upstream region of the housing interior that is less than ambient pressure at the upstream end portion, whereby ambient air is drawn into the housing interior at a sufficient flow to cause said movable closure to move into an open position, thereby to create an entryway into the upstream region from the upstream end portion and to draw the insect into the upstream region to be trapped therein when the movable closure returns to the closed position, whereby a length of the housing from the compression chamber to the upstream end portion remains unchanged during the step of creating air pressure.

19. A method according to claim 18 whereby creation of air pressure within the upstream region of said housing that is less than ambient pressure is accomplished by returning said compression chamber to an uncompressed position.

20. A method according to claim 18 including resiliently biasing said compression chamber into the uncompressed position.

21. A method according to claim 18 including mechanically maintaining said compression chamber in the compressed position.

22. A method according to claim 21 whereby said compression chamber is maintained in the compressed position by mechanically coupling it to a triggering assembly to define an engaged state for the triggering assembly.

23. A method according to claim 18 whereby evacuation of air from the housing is accomplished before the movable closure is placed proximate to the target insect.

24. A method according to claim 18 whereby the air is only evacuated through said downstream region.

25. A method according to claim 18 whereby said movable closure remains in the closed position during evacuation of the air through said sidewall.

26. A method according to claim 25 whereby said movable closure is retained in the closed position during evacuation of the air through said sidewall.

27. A method according to claim 26 whereby said movable closure is mechanically retained in the closed position during evacuation of air from said housing.

28. A method according to claim 18 whereby said movable closure is restricted from moving outwardly in an upstream direction, yet is adapted to move inwardly in a downstream direction as it moves into the open position.

29. A method according to claim 18 comprising permitting unconstrained movement of the insect within the upstream region after capture.

30. A method according to claim 29 comprising releasing the insect into ambient air after capture.

31. A method according to claim 18 comprising releasing the insect into ambient air after capture.

32. A method according to claim 18 wherein said upstream end portion includes a removable collection tube for trapping the insect, and comprising removing said collection tube and releasing said insect into ambient air after capture.

* * * * *